(12) United States Patent  
Wyatt (10) Patent No.: US 9,293,119 B2  
(45) Date of Patent: Mar. 22, 2016

(54) METHOD AND APPARATUS FOR OPTIMIZING DISPLAY UPDATES ON AN INTERACTIVE DISPLAY DEVICE

(71) Applicant: NVIDIA Corporation, Santa Clara, CA (US)

(72) Inventor: David Wyatt, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 154 days.

(21) Appl. No.: 14/148,604

(22) Filed: Jan. 6, 2014

(65) Prior Publication Data

US 2015/0194137 A1    Jul. 9, 2015

(51) Int. Cl.  
G09G 5/393       (2006.01)  
G06F 3/041       (2006.01)  
G09G 3/20        (2006.01)

(52) U.S. Cl.  
CPC .............. *G09G 5/393* (2013.01); *G06F 3/0412* (2013.01); *G09G 3/2096* (2013.01); *G09G 2330/021* (2013.01); *G09G 2330/022* (2013.01); *G09G 2354/00* (2013.01); *G09G 2360/08* (2013.01); *G09G 2360/18* (2013.01)

(58) Field of Classification Search  
None  
See application file for complete search history.

(56) References Cited

U.S. PATENT DOCUMENTS

| | | |
|---|---|---|
| 5,321,419 A | 6/1994 | Katakura et al. |
| 5,321,811 A | 6/1994 | Kato et al. |
| 5,355,503 A | 10/1994 | Soffel et al. |
| 5,396,443 A | 3/1995 | Mese et al. |
| 5,552,802 A | 9/1996 | Nonoshita et al. |
| 5,867,140 A | 2/1999 | Rader |
| 6,025,888 A | 2/2000 | Pauls |
| 6,118,462 A | 9/2000 | Margulis |
| 7,256,788 B1 | 8/2007 | Luu et al. |
| 7,388,579 B2 | 6/2008 | O'Gorman et al. |
| 7,522,167 B1 | 4/2009 | Diard et al. |
| 8,355,449 B2 | 1/2013 | Moccagatta et al. |
| 8,437,405 B1 | 5/2013 | Moccagatta et al. |
| 8,816,985 B1 | 8/2014 | Tate et al. |
| 2002/0159525 A1 | 10/2002 | Jeong |
| 2003/0043134 A1* | 3/2003 | Cairns et al. ................ 345/204 |
| 2003/0158608 A1 | 8/2003 | Ishikawa et al. |
| 2003/0235249 A1 | 12/2003 | Zhao et al. |
| 2004/0114576 A1 | 6/2004 | Itoh et al. |
| 2004/0184548 A1 | 9/2004 | Kerbiriou et al. |
| 2005/0012749 A1 | 1/2005 | Gonzalez et al. |
| 2005/0052446 A1 | 3/2005 | Plut |
| 2007/0153007 A1 | 7/2007 | Booth et al. |
| 2008/0174606 A1* | 7/2008 | Rengarajan et al. .......... 345/531 |
| 2009/0109159 A1 | 4/2009 | Tsai |
| 2009/0204830 A1 | 8/2009 | Frid et al. |
| 2010/0085280 A1 | 4/2010 | Lambert et al. |

(Continued)

*Primary Examiner* — Maurice L McDowell, Jr.

(57) ABSTRACT

A solution is proposed to perform display updates in a lower power user interface. According to one embodiment, the display panel is placed in the lower possible refresh rate that can be supported. Rendered updates are presented to the displays at the fasted possible pixel rates the communication interface between the rendering component to the display panel can support, and a buffer on the receiving end of the display receives and stores updated frames as they are rendered and transmitted. Subsequent display updates (generated in response to subsequent sensor input, for example) may be created and transmitted as soon as the preceding display frames are buffered. In the meantime, as soon as the update frame is transmitted, the timing controller of the display panel is instructed to interrupt the current refresh period and to immediately rescan the frame.

22 Claims, 6 Drawing Sheets

(56) References Cited

U.S. PATENT DOCUMENTS

| | | |
|---|---|---|
| 2011/0003621 A1 | 1/2011 | Atsumi |
| 2011/0102446 A1 | 5/2011 | Oterhals et al. |
| 2011/0141133 A1 | 6/2011 | Sankuratri et al. |
| 2011/0291748 A1 | 12/2011 | Li et al. |
| 2012/0005509 A1 | 1/2012 | Araki et al. |
| 2012/0117129 A1* | 5/2012 | Wang et al. .................. 707/827 |
| 2012/0162238 A1 | 6/2012 | Fleck et al. |
| 2012/0191993 A1 | 7/2012 | Drader et al. |
| 2012/0268480 A1 | 10/2012 | Cooksey et al. |
| 2013/0135291 A1* | 5/2013 | Davidson ...................... 345/419 |
| 2013/0165181 A1 | 6/2013 | Hasegawa |
| 2014/0015763 A1 | 1/2014 | Woolley et al. |
| 2014/0104243 A1* | 4/2014 | Sakariya et al. .............. 345/204 |
| 2014/0115366 A1 | 4/2014 | Joo et al. |
| 2014/0184611 A1 | 7/2014 | Wyatt et al. |
| 2015/0193062 A1 | 7/2015 | Wyatt |

* cited by examiner

Exemplary Computer System 600

Figure 6

METHOD AND APPARATUS FOR OPTIMIZING DISPLAY UPDATES ON AN INTERACTIVE DISPLAY DEVICE

RELATED APPLICATIONS

This application is related to co-pending application Ser. No. 14/148,599, entitled "Method and Apparatus for Buffering Input in a Low Power State," to David Wyatt, and filed Jan. 6, 2014, on the same day herewith.

BACKGROUND OF THE INVENTION

The modernization of mobile computing devices has shifted towards viewing displays with touch-sensitive capabilities. User Interfaces for these devices—which may include smartphones, tablets, clamshells, among other devices—face a key challenge: minimizing power consumption rates while implementing the fastest response times to input (typically sensor input) possible. For example, to achieve lowest power consumption rates on the display may require multiple operations which can include: running the display at the lowest refresh rate (i.e. the longest time between scan-out on display); putting the application processor or graphics processing unit into the lowest available power sleep state; and/or running the touch sensor in the lowest possible scan rate to conserve power.

However, to achieve faster response times, the refresh time—the time it takes for the update to appear on the screen and for the light shining from the pixel to reach the eye is directly affected by the time it takes to refresh the screen—is a key factor, and decreasing the refresh rate typically results in a slower response time. In addition, in order to respond quickly (e.g., without encountering latency from the transition between sleep and wake power states) the processor(s) must be in an operating (non sleep) state, and faster performance states will ensure faster responses to the input. The touch sensor will also need to be operating in an increased scan rate to ensure every touch is processed and an appropriate response may be rendered.

Unfortunately, the goals of reducing power consumption rates and increasing responsiveness can often have conflicting implementations. The current state-of-the-art approach for example, is to run the touch scan and display at higher rates, and to introduce system sleep states during which the display is turned off and the system appears unresponsive. A popular implementation will, for example, try to collect sensor input samples encountered during each display refresh period in order to process updates together; process and coordinate the input with the presentation of the update on the next refresh period; and sleep the system in between the display refreshes. However, these implementations often are strictly limited to pre-programmed, regular refresh periods or intervals, and therefore updating of the display is limited to the frequency at which the display is refreshed by the system. New technologies have been introduced in which with variable and/or faster refresh rates are still restricted to updating at the regular refresh periods. As a result, this may cause inefficiencies in both power consumption—such as when less frequent refreshes may be suitable—and responsiveness—such as when the screen is not updated quickly enough to reflect actual input.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention proposes a solution for processing input in a lower power user interface of touch-sensitive display panels. According to an embodiment, a mobile computing device is placed in the low power mode. This mode may be preceded by a period of inactivity and may include, for example, a low scan rate, wide matrix, lower power, scanning mode utilized by a sensor controller (such as a touch controller corresponding to a touch sensor). During this mode, the sensor controller produces a raw event/interrupts on a detected touch. Upon detecting a touch, the sensor controller also automatically increases the scan rate of the touch sensor, while the triggered event or interrupt proceeds to wake the system into a higher power state. Subsequent touch data received while the system is booting into the higher power state is buffered by the timing controller, or by a bridge chipset, while the processor(s) in the power up. When awake, the processor(s) collect the touch samples from the buffer, and processes the touch samples, generating updated displays where necessary.

According to another aspect of the present invention, a solution is proposed to perform display updates in a lower power user interface. According to one embodiment, the display panel is placed in the lower possible refresh rate that can be supported. Rendered updates are presented to the displays at the fasted possible pixel rates the communication interface between the rendering component to the display panel can support, and a buffer on the receiving end of the display receives and stores updated frames as they are rendered and transmitted. Subsequent display updates (generated in response to subsequent sensor input, for example) may be created and transmitted as soon as the preceding display frames are buffered. In the meantime, as soon as the update frame is transmitted, the timing controller of the display panel is instructed to interrupt the current refresh period and to immediately rescan the frame.

According to yet another aspect of the invention, mobile computing systems are provided to perform the methods described above. In an embodiment, the system may include a display panel—implemented as an integrated hardware platform including a display screen controlled by a timing controller, and a touch sensor array controlled by a sensor controller. According to such embodiments, the display panel may be a self-refreshing display panel, wherein the refreshing operations are performed in the timing controller. In further embodiments, the timing controller includes a frame buffer, and is communicatively coupled to a processing device (such as a GPU) which renders the graphical output displayed in the display screen. In an alternate embodiment, a bridge chipset may be interposed (physically and/or communicatively) between the display panel and the processing device. According to these embodiments, the bridge chipset may be self-refreshing, and may drive the refreshing operations of the display panel. In such embodiments, the frame buffer may be implemented in the bridge chipset.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the claimed subject matter are presented to provide a smooth user interface capable of operating at low power rates while maintaining efficacy and responsiveness. In certain embodiments, power savings may be achieved by entering the system into a sleep state, and buffering sensor input when a touch is detected and while the system transitions into an active, full power state. In further embodiments, further power savings may be achieved by drastically reducing refresh rates of the display panel, and introducing a display refresh asynchronously as needed during the refresh cycle by leveraging the frame buffer to store display data immediately upon rendering.

Mobile Computing Systems

Figure 1:
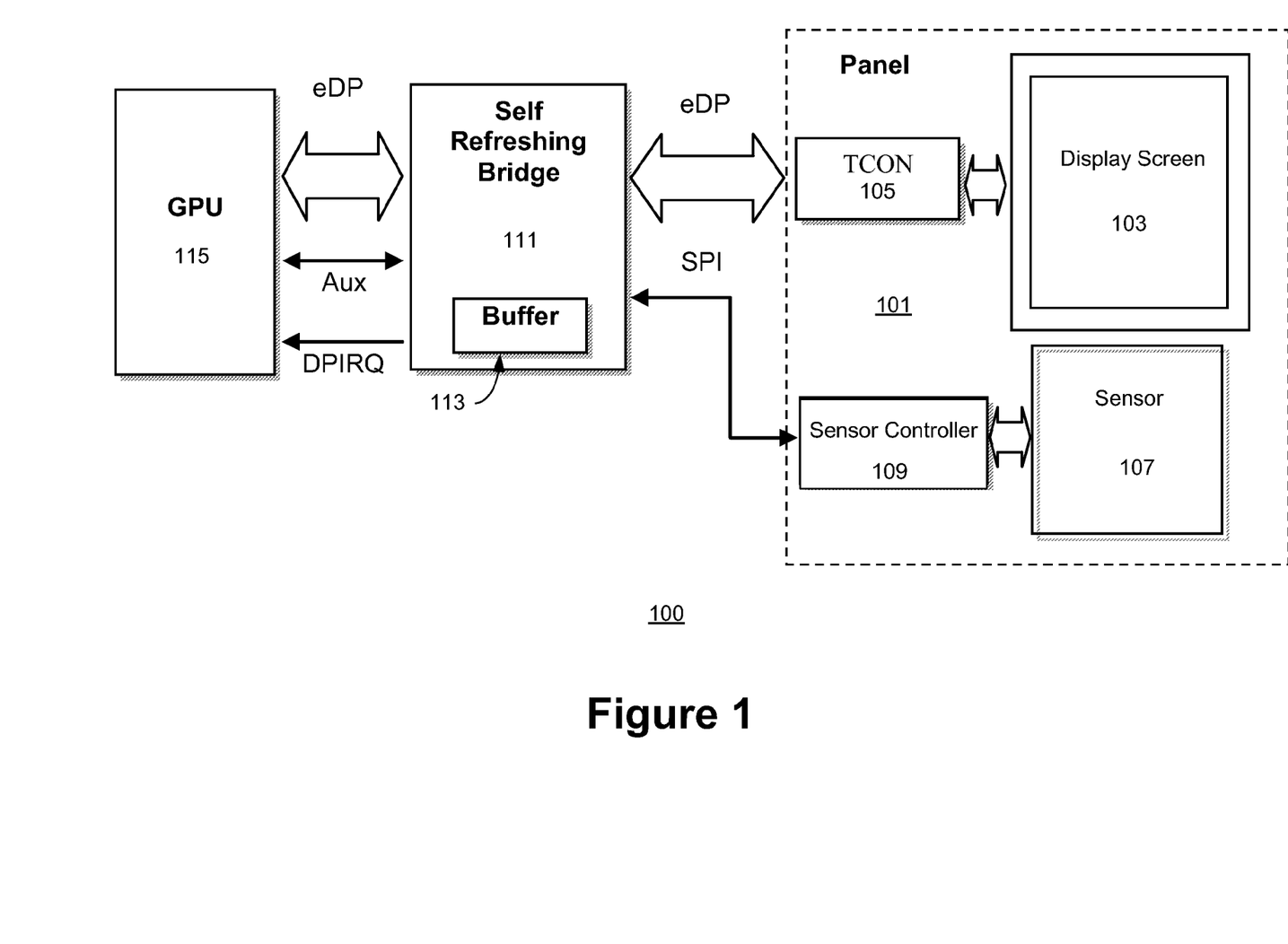
FIG. 1 depicts an exemplary mobile computing system with a self-refreshing bridge chipset, in accordance with various aspects of the present invention.

FIG. 1 depicts an exemplary mobile computing system 100 with a self-refreshing bridge chipset, in accordance with various aspects of the present invention. According to various embodiments, the mobile computing system may be implemented as, for example, a mobile telephone, a tablet computer, a clamshell computing device, a smartphone, a laptop computer, etc. As depicted in FIG. 1, mobile computing device 100 includes a display panel 101 communicatively coupled to a bridge chipset 111, itself communicatively coupled to a processing unit (e.g., GPU 115). In an embodiment, graphical output displayed in the display panel 101 (specifically, in the display screen 103) may be produced and rendered in the GPU 115, and transmitted to the bridge chipset 111 via one or more data communication interfaces. In an embodiment, the display screen 103 may be implemented as a liquid crystal display (LCD) panel. In one or more embodiments, the processing unit may be implemented as either an integrated graphics processing unit (iGPU) or a discrete graphics processing unit (dGPU). In one or more embodiments, the bridge chipset may comprises processing and memory access functionality and may include an application processor, or central processing unit (CPU).

Figure 2:
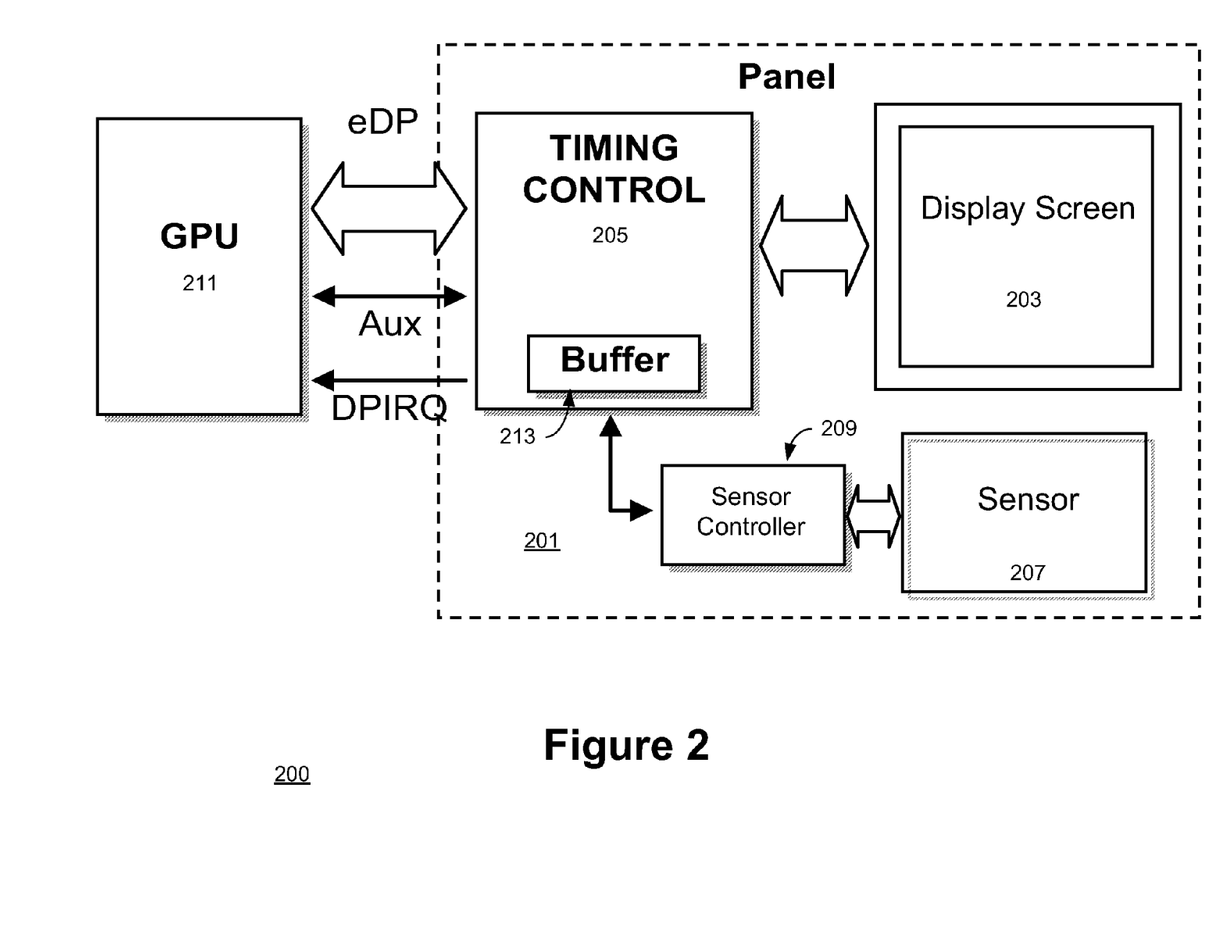
FIG. 2 depicts an exemplary mobile computing system with a self-refreshing timing controller, in accordance with various aspects of the present invention.

As presented in FIGS. 1 (and 2), rendered data may be transmitted through an embedded display port (eDP) interface communicatively coupling the GPU 115 with the bridge chipset 111, and a second eDP interface communicatively coupling the bridge chipset 111 with a timing controller 105 in the display panel. According to further embodiments, the bridge chipset may be implemented as a self-refreshing bridge chipset. That is, display signals sent to, and used by the display panel to synchronize the timing and content of the displays may be managed by the self-refreshing bridge chipset 111 without input from the processing unit (GPU 115).

During conventional power saving techniques, the latency resulting from the transition from exiting sleep to fully functioning power states would typically result in losing sensor input data that was submitted during the time (as scanning may not be performed). In contrast, embodiments of the claimed invention are able to enter a low power or sleep state without losing sensor input data due to sleep exit latency. In one or more embodiments, the system may be placed in a low power or sleep state by triggering one or more events, such as low battery life detected, system idleness and/or lack of detected user input after a pre-determined amount of time, etc. During the sleep state the sensor controller 109 enters into a low scanning mode, which may include operating at a low power scan rate, wherein the frequency at which the touch sensor array 107 is scanned is reduced to the lowest frequency supported. During the sleep state, the GPU 115, bridge chipset 111, display screen 103, and timing controller may each operate in a sleep or reduced power state as well.

When a sensor input is detected by the touch sensor array 107, the scanning mode is automatically changed to the active scanning mode, and the rate and touch data acquired is automatically increased to active levels. The sensor controller also generates a wake event (and/or interrupt) that is transmitted through the other components of the system. In one embodiment, sensor input may correspond to any input received in a sensor such as a touch sensor (e.g., touch sensor array). According to these embodiments, the sensor controller 109 may be implemented as a touch controller. While embodiments are described herein to recite touch sensors and touch controllers, alternate embodiments may be well suited to other sensor types such as, for example, accelerometers, global positioning system (GPS) devices, ambient light sensors, motion sensors, noise sensing devices, radio sensors, wireless frequency sensors, tactile user input sensors, fingerprint sensors, etc., and appropriate sensor controllers corresponding to the other sensor types.

For example, the wake event (and/or interrupt) may be sent from the sensor controller to the bridge chipset 111 via the serial peripheral interface (SPI), and forwarded on to the processing unit (GPU 115) as a wake event (via an auxiliary interface labeled "AUX") and/or as an interrupt (via a display port interrupt request, labeled "DPIRQ"). While the other system components begin the wake process to transition from the low power system state to an active system state, subsequent sensor input detected after the initial sensor input by the sensor controller 109 and through the touch sensor array 107 may be buffered in a frame buffer 113 located in the bridge chipset 111. Once the remaining system components achieve an active power state, the processing unit(s) (e.g., the bridge chipset and/or processing unit 115) may retrieve the sensor input buffered in the buffer 113, process the input, render updated graphical displays as necessary, and transmit the rendered display data back to the display panel (e.g., via the eDP interface). According to embodiments depicted in FIG. 1, memory (e.g., random access memory) may be used as the frame buffer 113.

The presentation of updates is normally a process of frame composition, where rendered frames are stored in back buffers before being transmitted to the primary surface for a scan-out, so as to align updates with vertical refreshes (refresh periods). However, these vertical refreshes can be a non-trivial amount of time, and since new updates are typically limited to the refresh rate, this can produce a slight delay or lag in the responsiveness of the device experienced by the user if sensor input is submitted at a rate higher than the refresh rate. Conventional solutions to increase the responsiveness of the device is typically to increase the refresh rate. However, increasing the refresh rate can substantially increase the rate in which power is consumed. According to another aspect of the claimed invention, system 100 may also be used to provide display updates responsively, while maintaining power savings.

According to various embodiments, during a low power or sleep mode, the timing controller may change to a low refresh rate, such that the blanking interval (time between updates) is long, and the active interval (update time) is short. whenever an update of the frame displayed in the display screen 103 is required (via sensor input, or according to programmed instructions), the frame is rendered in the processing unit 115 and transmitted for presentation in the display as quickly as possible, via the eDP interface for example. The display update may be buffered (e.g., also in the frame buffer 113). Once the update begins transmission, the timing controller 105 is instructed to end the current vertical refresh immediately and to rescan the frame. Thus, display updates may be rendered and displayed responsively, ad hoc, while low refresh rates (and thus, lower power consumption rates) can be maintained.

FIG. 2 depicts an alternate embodiment of the mobile computing device depicted in FIG. 1. As presented in FIG. 2, mobile computing device 200 includes a display panel 201 communicatively coupled to a processing unit (e.g., GPU 211). Unlike the embodiment presented in FIG. 1, mobile computing device 200 does not include a bridge chipset, with certain functions previously performed by the bridge chipset in FIG. 1 being allocated to the timing controller 205 and/or the processing unit (GPU 211). For example, the timing controller 205 may be implemented with self-refresh functionality, and may synchronize the timing and content displayed in the display screen 203 without input from either the processing unit 211 or a bridge chipset. According to these embodiments, the timing controller 205 may include a relatively small amount of memory which may be used as a frame buffer 213. Other components of FIG. 2, including the display screen 203, the touch sensor array 207, and sensor controller 209 correspond to similarly numbered and labeled elements in FIG. 1, and exhibit similar characteristics and perform similar functionality, including, but not limited to, all of the identified features described in FIG. 1.

Sensor Input Buffering in Low Power System State

Figure 3:
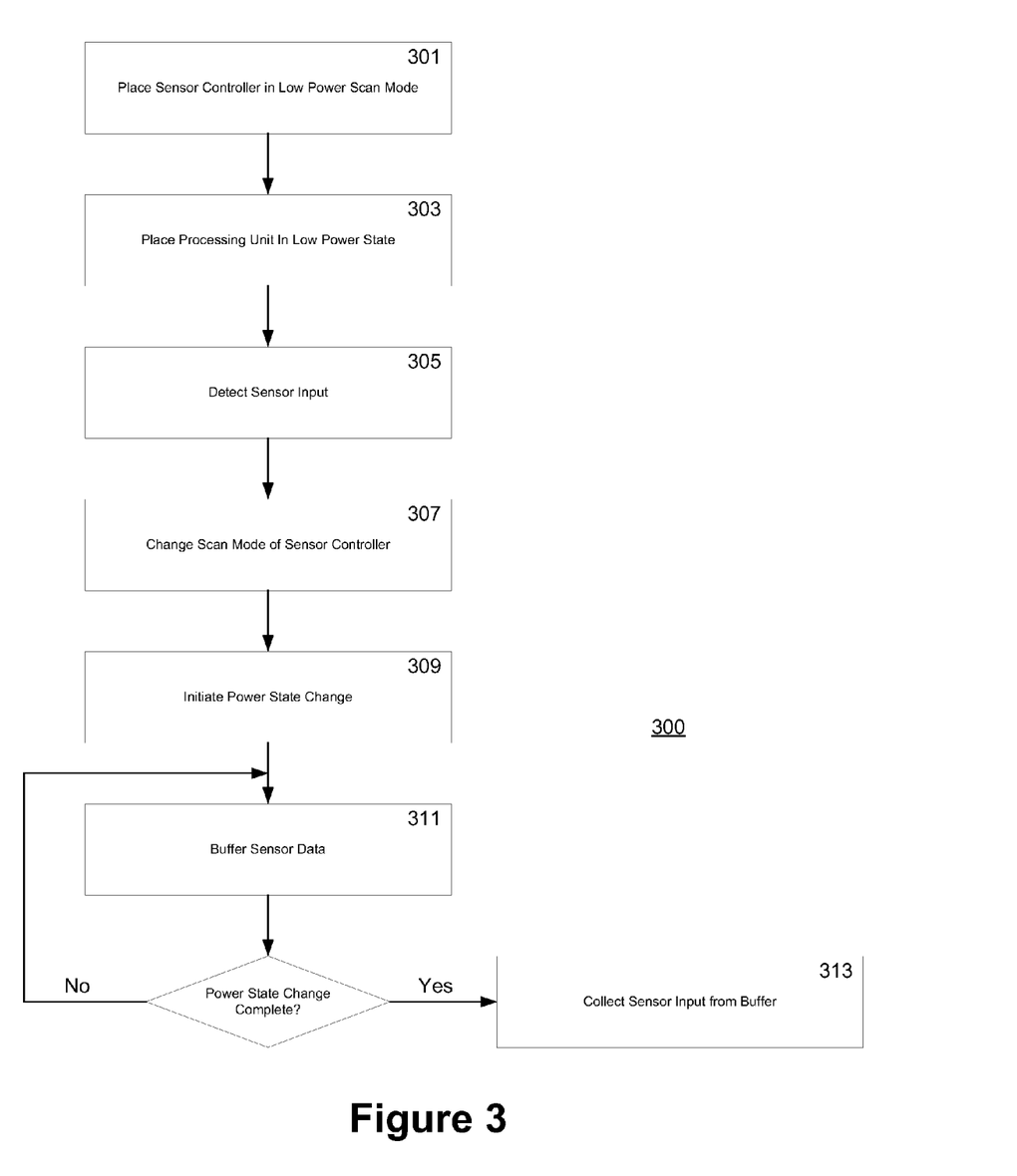
FIG. 3 depicts a flowchart of an exemplary process for processing sensor input in a low power user interface, in accordance with various embodiments of the present invention.

FIG. 3 depicts a flowchart of a process 300 for buffering sensor input received while operating in a low power system state, in accordance with embodiments of the present invention. Steps 301-313 describe the steps comprising the process depicted in the flowchart 300 of FIG. 3.

The process 300 begins when a mobile computing device is placed in a sleep state (e.g., due to idleness, low battery power, etc.). At step 301, the sensor controller of a display panel of the mobile computing device is placed in a lower power scan mode. Placing the sensor controller in a low power scan mode may include, for example, changing the scanning rate of a touch sensor array corresponding to the sensor controller, using a wide touch matrix to generate sensor input data, and reducing the rate of power consumed by the sensor controller and accompanying touch sensor array. In one embodiment, the wide touch matrix determines only when a sensor input is detected, and not location and/or intensity data corresponding to each sensor input/event. While the sensor controller is in a lower power scan mode, the sensor controller is configured to generate a wake event and/or interrupt in response to detected sensor input. At step 303, one or more processing units of the mobile computing device are placed in a low power system state. The one or more processing units may include one or more graphical processing units (GPUs), central processing units (CPUs), application processors (APs), or bridge chipsets.

At step 305, a sensor input on the display panel is detected. Sensor input may include for example, user input via tactile movement performed on the display panel and detected by the touch sensor array (during lower power scan mode). In response to the detected sensor input, the scanning mode of the sensor controller is automatically changed from the low power scanning mode to an active or normal level scanning mode at 307, and a raw wake event and/or interrupt is generated and propagated to the components of the system operating in a low power system state. Changing the scan mode may include increasing the frequency and/or sensitivity of the sensory array scan rate, and changing the touch matrix to determine and record both position and intensity of sensor input. Once the wake event or interrupt is generated, the change in the power state of the processing unit from the sleep or low power system state to an active power state is initiated at step 309. In one or more embodiments, this may include performing a booting process for one or more components. In still further embodiments, the change in the power state of the processing unit to the active or normal power state also includes increasing the refresh rate of the display panel to an active or normal mode.

Subsequent sensor input received by the system after step 305 (when the initial sensor input was detected) is stored in a frame buffer at step 309 while the system transitions from the sleep or low power system state to an active system state. According to various embodiments, the frame buffer may be implemented as part of a timing controller in the display panel, or as a sub-component of a bridge chipset. As depicted in FIG. 3, sensor input is continuously buffered until the change in the power state of the system is completed. Once the system is restored to a fully operational/active system state, a processing unit collects the buffered sensor input and processes the data. In one embodiment, sensor input is thereafter processed by the processing unit without buffering the data in the frame buffer, until the system reenters the sleep state, wherein process 300 may be repeated. Unlike contemporary solutions wherein sensor input is lost during the sleep exit latency period, sensor input is buffered during the same transitional period in embodiments of the current invention, thus ensuring that no input samples are lost even while entering the system into a deep sleep state.

Presenting Display Updates to a Display Panel

Figure 4:
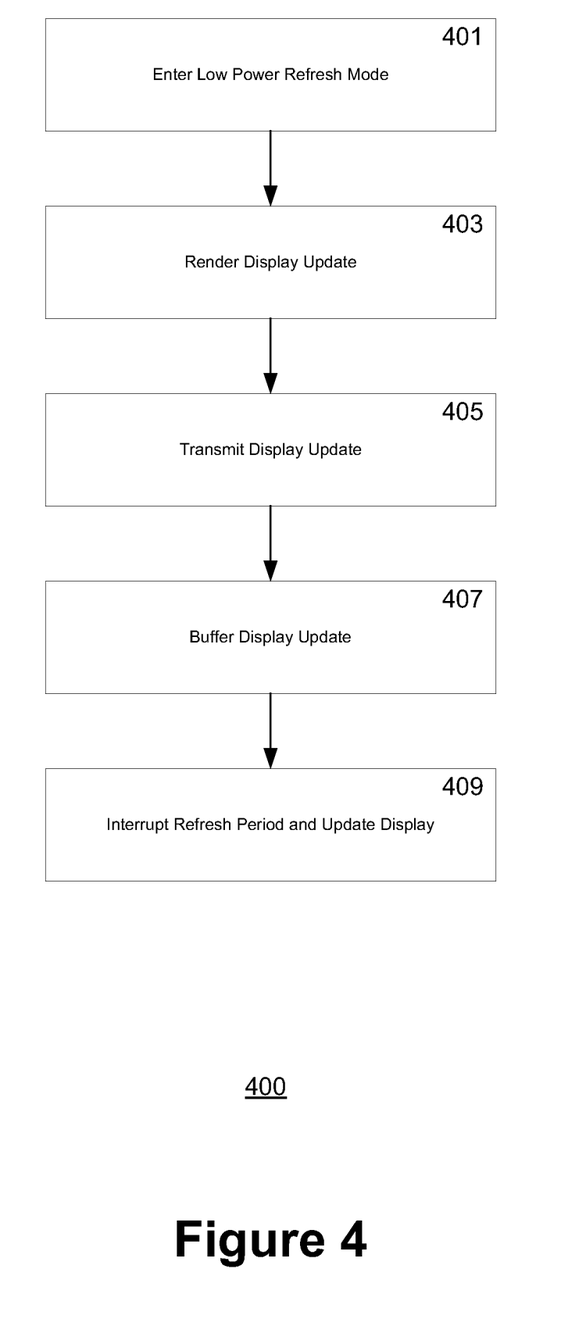
FIG. 4 depicts a flowchart of an exemplary process for presenting display updates in a display panel, in accordance with various embodiments of the present invention.

FIG. 4 depicts a flowchart of a process 400 for presenting display updates in a display panel while exhibiting power saving, in accordance with embodiments of the present invention. Steps 401-409 describe the steps comprising the process depicted in the flowchart 400 of FIG. 4.

The process 400 also begins when a mobile computing device is placed in a sleep state (e.g., due to idleness, low battery power, etc.). At step 401, the timing controller of a display panel of the mobile computing device is placed in a lower power refresh mode that corresponds to the refresh rate of a display screen coupled to the timing controller. In one embodiment, the timing controller is played in the lowest power refresh rate that is supported by the system, and may be implemented to include the longest blanking interval and shortest active time possible. Placing the timing controller in such a mode allows more opportunity for ending a refresh cycle without interrupting an active scan-out.

At step 403, a display update is rendered (in response to touch or other input, or according to pre-programmed instructions, for example) in a processing unit (e.g., a GPU, or AP) and transmitted to the display panel as quickly as possible at step 405. In one embodiment, the update is presented to the display at the fastest possible pixel rate the interface (e.g., eDP) is able to support. A buffer is used to receive the transmitted update data at step 407. In one embodiment, the buffer is a frame buffer implemented as part of a timing controller in the display panel, or as a sub-component of a bridge chipset, and may be the same frame buffer used to buffer sensor input in step 309 of process 300. In contrast to contemporary alternatives, in one or more embodiments of the claimed invention, the buffer may store additional frames such that subsequent updated frames may be rendered and stored without waiting for the current refresh cycle or preceding frame to scan out. According to further embodiments, from the time the update frame is completely stored in the buffer, a composition engine in the processing unit can be instructed that the update has been presented to the display panel and a new update frame may be created and prepared for transmission.

At the moment the display update starts being transmitted (e.g., at step 405), the timing controller of the display panel interrupts the current refresh cycle immediately (including mid scan-out) and ad hoc rescans the frame to update the display with a new frame comprising the display update stored in the buffer. This step may be referred to as a "crash sync." Because the rescan due to this crash syncs is performed after the update is started, and as the update is transmitted at a rate that exceeds the scan rate, the beam updating pixels on the display does not overwrite mid-frame, and avoids causing tearing or other undesirable artifacts.

Figure 5A:
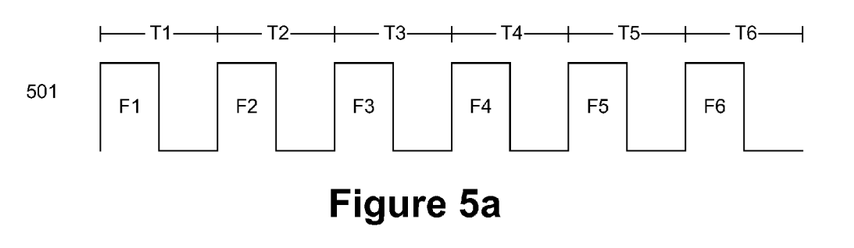
FIG. 5a depicts an exemplary timing pattern with an active refresh rate for rendered output for a mobile computing system, in accordance with various embodiments of the present invention.
Figure 5B:
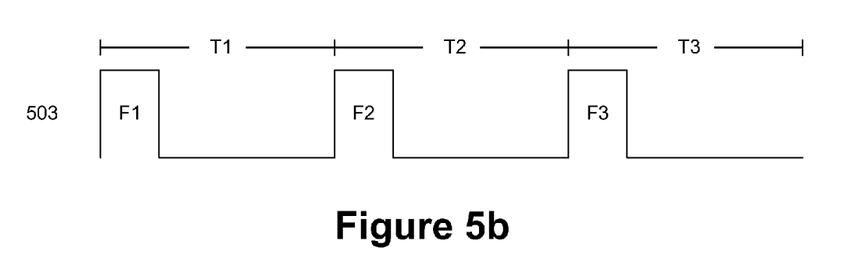
FIG. 5b depicts an exemplary timing pattern with a low refresh rate for rendered output for a mobile computing system, in accordance with various embodiments of the present invention.
Figure 5C:
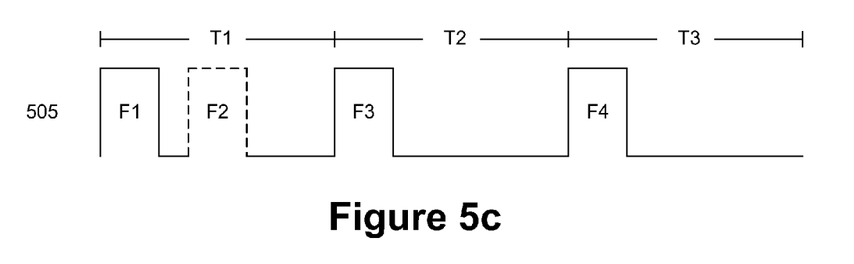
FIG. 5c depicts an exemplary timing pattern with a low refresh rate with a display update interruption for rendered output for a mobile computing system, in accordance with various embodiments of the present invention.

FIGS. 5a through 5c depict exemplary timing cycles of various refresh rates exhibited by a mobile computing system in accordance with various embodiments of the subject invention. FIG. 5a depicts a timing cycle 501 of a mobile computing device operating with an active refresh rate (e.g., 60 hz). As depicted in timing cycle 501, a display refresh (e.g., F1-F6) is performed at regular intervals (T1-T6), with each interval comprising 1/60th of a second in a 60 hz refresh rate, for example. The vertical axis corresponds to a consumption of power. For example, during a display refresh, power may be consumed, while no power (or a trivial amount of power) may be consumed during the blanking intervals between refreshes.

FIG. 5b depicts a timing cycle 503 of a mobile computing device operating during a low power refresh rate (e.g., 30 hz). As depicted in timing cycle 503, each interval (T1, T2, T3) comprises 1/30th of a second, with the frequency of the display refreshes (F1, F2, F3) likewise decreasing by half, and a corresponding decrease in power consumption. FIG. 5c depicts a timing cycle 505 of a mobile computing device operating during the low power refresh rate (e.g., 30 hz) and refresh intervals (T1, T2, T3) of FIG. 5b, but including the introduction of a crash synch at (F2). The crash synch may be introduced at any time interval. As depicted, the crash synch is introduced following the refresh at F1 in T1. In one embodiment, once the crash synch is completed, the former refresh cycle is resumed, and the next refresh periods proceed as planned (e.g., F3 at T2, F4 at T3). In alternate embodiments, a crash synch will reset the refresh rate (e.g., an entire interval will follow the crash synch before a next refresh). Accordingly, by dropping the refresh rate of the display screen and timing controller, significant power savings can be achieved while no discernible loss in responsiveness due to the introduction of ad hoc rescans and interruption of current refresh cycles.

Exemplary Computing System

Figure 6:
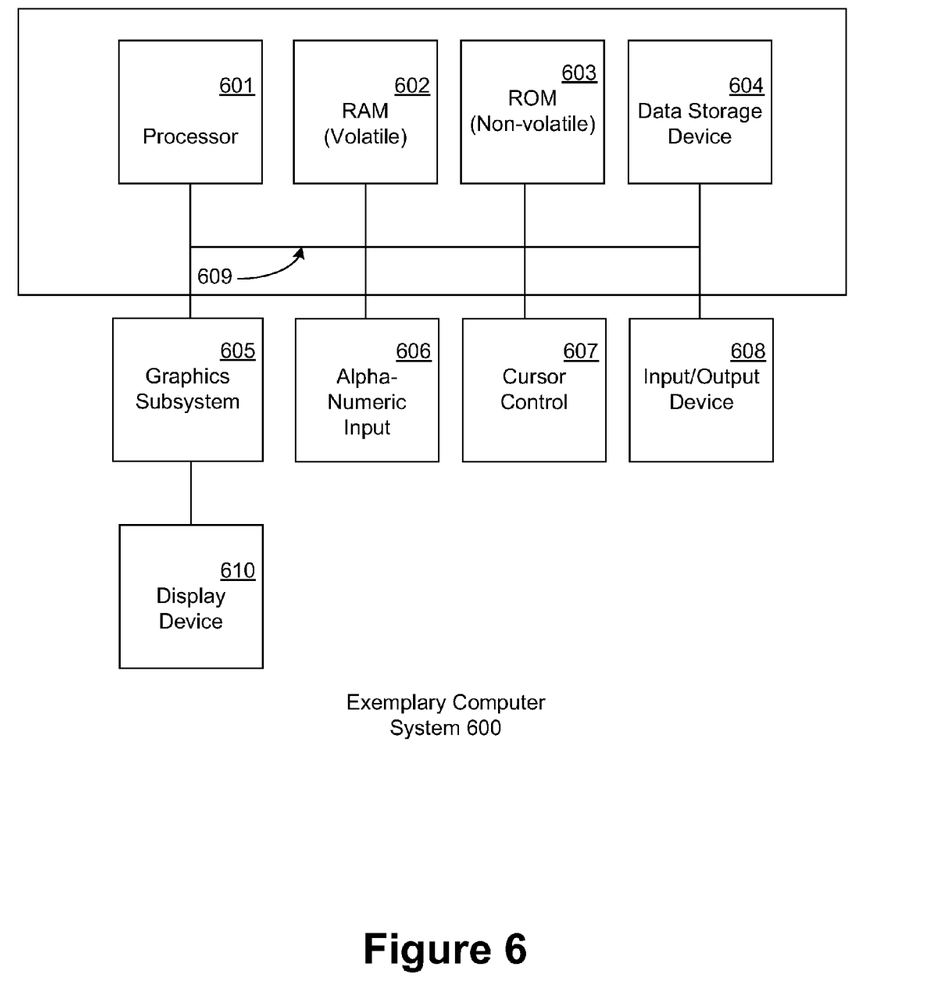
FIG. 6 depicts an exemplary computing system, in accordance with embodiments of the present invention.

As presented in FIG. 6, an exemplary system 600 upon which embodiments of the present invention may be implemented includes a general purpose mobile computing system environment, such as mobile computing systems 100 and 200 described above with respect to FIGS. 1 and 2, respectively. In its most basic configuration, computing system 600 typically includes at least one processing unit 601 and memory, and an address/data bus 609 (or other interface) for communicating information. Depending on the exact configuration and type of computing system environment, memory may be volatile (such as RAM 602), nonvolatile (such as ROM 603, flash memory, etc.) or some combination of the two.

Computer system 600 may also comprise an optional graphics subsystem 605 for presenting information to the computer user, e.g., by displaying information on an attached display device 610. In one embodiment, the processing and image enhancement of the image data received may be performed, in whole or in part, by graphics subsystem 605 in conjunction with the processor 601 and memory 602, with any resulting output displayed in attached display device 610.

Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by data storage device 607. Computer storage media includes volatile and nonvolatile, removable and non-removable media implemented in any method or technology for storage of information such as computer readable instructions, data structures, program modules or other data. RAM 602, ROM 603, and data storage device 607 are all examples of computer storage media.

Computer system 600 also comprises an optional alphanumeric input device 606, an optional cursor control or directing device 607, and one or more signal communication interfaces (input/output devices, e.g., a network interface card) 609. Optional alphanumeric input device 606 can communicate information and command selections to central processor 601. Optional cursor control or directing device 607 is coupled to bus 609 for communicating user input information and command selections to central processor 601. Signal communication interface (input/output device) 609, also coupled to bus 609, can be a serial port. Communication interface 609 may also include wireless communication mechanisms. Using communication interface 609, computer system 600 can be communicatively coupled to other computer systems over a communication network such as the Internet or an intranet (e.g., a local area network), or can receive data (e.g., a digital television signal).

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for displaying input in a touch-sensitive display panel, the method comprising:
    placing a display panel of a mobile computing device in a low power refresh mode;
    rendering a display update in response to detecting a sensor input received in the display panel;
    transmitting the display update to the display panel;
    buffering the display update in a frame buffer comprised in the mobile computing device; and
    interrupting a current refresh period of a timing controller of the display panel by rescanning a current frame displayed in the display panel to include the display update from the frame buffer.

2. The method according to claim 1, wherein the low power refresh mode comprises a lowest power refresh rate that is supported by the display panel, and further comprising removing the display panel from the low power refresh mode in response to the rescanning the current frame.

3. The method according to claim 1, wherein the display update is rendered in a processing unit of the mobile computing device.

4. The method according to claim 3, wherein the transmitting the display update comprises transmitting the display update to the display screen from the processing unit at a fastest pixel rate supported by the display panel.

5. The method according to claim 4, further comprising rendering a next display update in the processing unit, wherein the rendering the next display update is performed after the transmitting the display update.

6. The method according to claim 5, wherein the rendering the next display update is performed after the buffering the display update is completed.

7. The method according to claim 1, wherein the processing unit comprises at least one of:
    an application processor;
    a graphics processing unit (GPU);
    a central processing unit (CPU); and
    a bridge chipset.

8. The method according to claim 1, wherein the frame buffer is comprised in the timing controller comprised in the display panel.

9. The method according to claim 8, wherein the timing controller comprises a self refreshing timing controller.

10. The method according to claim 1, wherein the frame buffer is comprised in a bridge chipset comprised in the mobile computing device and communicatively coupled to the display panel.

11. The method according to claim 10, wherein the bridge chipset comprises a self refreshing chipset.

12. A system, comprising:
    a display panel comprising:
        a display screen;
        a sensor configured to detect input on the display screen;
        a sensor controller coupled to the sensor array and configured to control an operation of the sensor array;
        a timing controller coupled to the display screen and configured to update a display frame corresponding to output displayed on the display screen at a refresh rate comprising a plurality of regular refresh periods; and
    a processing unit configured to render a plurality of display updates,
    wherein, the display panel is operable to enter into a low refresh state,
    wherein, while the display panel is operating in the low refresh state, display updates responsive to sensor input received by the display panel are rendered in the processing unit and buffered in a frame buffer,
    further wherein, the system is configured to interrupt a current refresh period of the timing controller of the display panel by rescanning a current frame displayed in the display panel to include the display update from the frame buffer.

13. The system according to claim 12, wherein the system comprises at least one mobile device from a group of mobile devices comprising:
    a mobile phone;

a tablet;
a clamshell computing device;
a laptop computer.

14. The system according to claim 12, wherein the processing unit comprises at least one processing unit from a group of processing units comprising:
a an application processor;
a graphics processing unit;
a central processing unit;
a bridge chipset.

15. The system according to claim 14, wherein the bridge chipset comprises a self-refreshing bridge chipset.

16. The system according to claim 15, wherein the frame buffer comprises a buffer in the bridge chipset.

17. The system according to claim 12, wherein the frame buffer comprises a buffer in the timing controller.

18. The system according to claim 12, wherein the display screen comprises a liquid crystal display (LCD).

19. The system according to claim 12, wherein each of the display updates are rendered by the processing unit immediately after a preceding update of the plurality of display updates is buffered in the frame buffer.

20. The system according to claim 12, wherein the sensor comprises at least one of the following group of sensor types:
a touch sensor array;
an accelerometer;
a GPU device;
an ambient light sensor;
a motion sensor;
a noise sensing device;
a radio sensor;
a wireless frequency sensor;
a tactile user input sensor; and
a fingerprint sensor.

21. The system according to claim 12, wherein the sensor controller comprises at least one of the following group of sensor types:
a touch controller;
an accelerometer controller;
GPS controller;
an ambient light controller;
a motion controller;
a noise controller;
a radio controller;
a wireless frequency controller;
a tactile user input controller; and
a fingerprint controller.

22. A non-transitory computer readable medium with programmed instructions embodied therein for displaying updated display content responsive to sensor input, the program instructions comprising:
instructions to place a display panel of a mobile computing device in a low power refresh rate;
instructions to render a display update in response to detecting input received in the display panel;
instructions to transmit the display update to the display panel;
instructions to buffer the display update in a frame buffer comprised in the mobile computing device; and
instructions to interrupt a current refresh period of a timing controller of the display panel by rescanning a current frame displayed in the display panel to include the display update from the frame buffer.

* * * * *